…

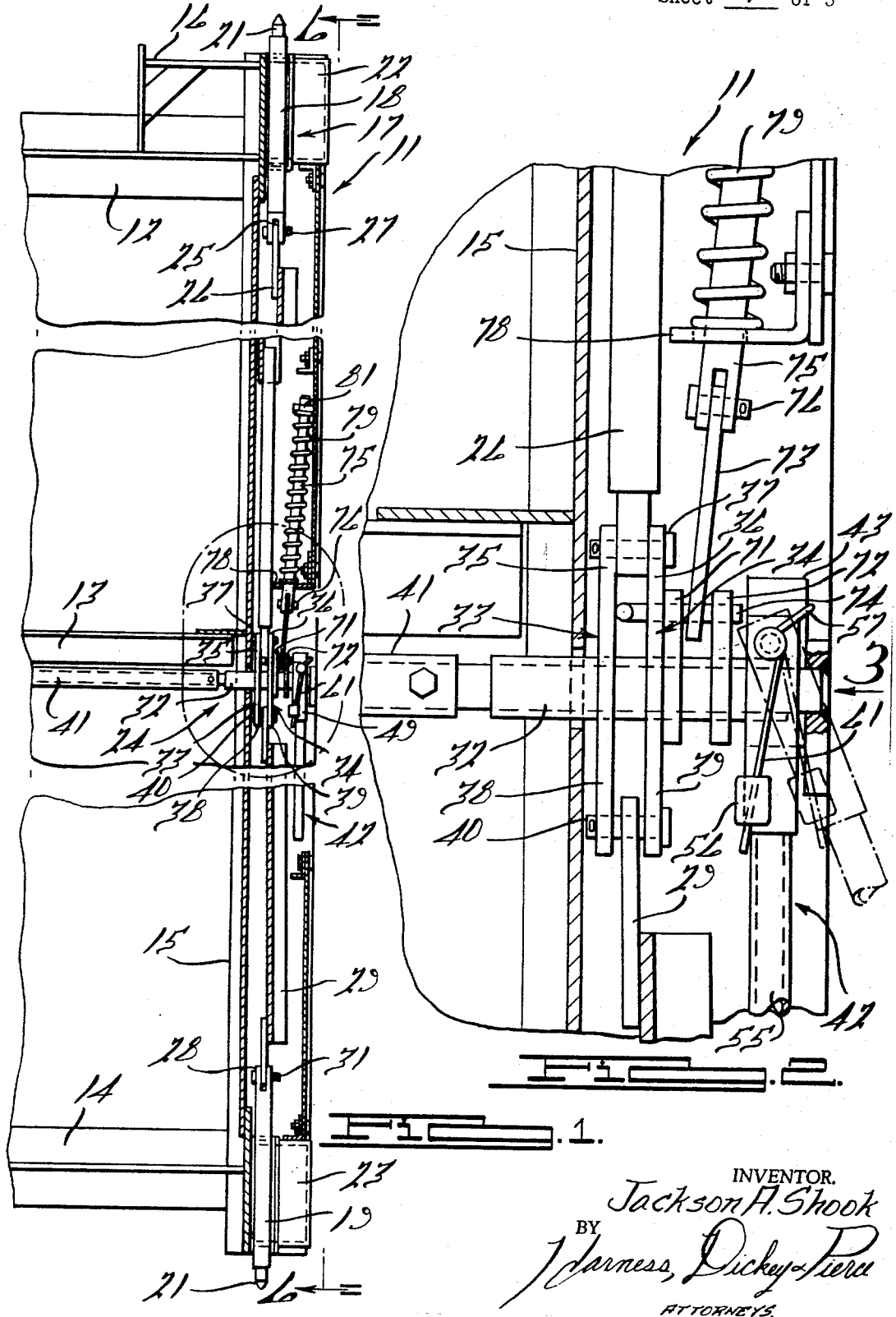

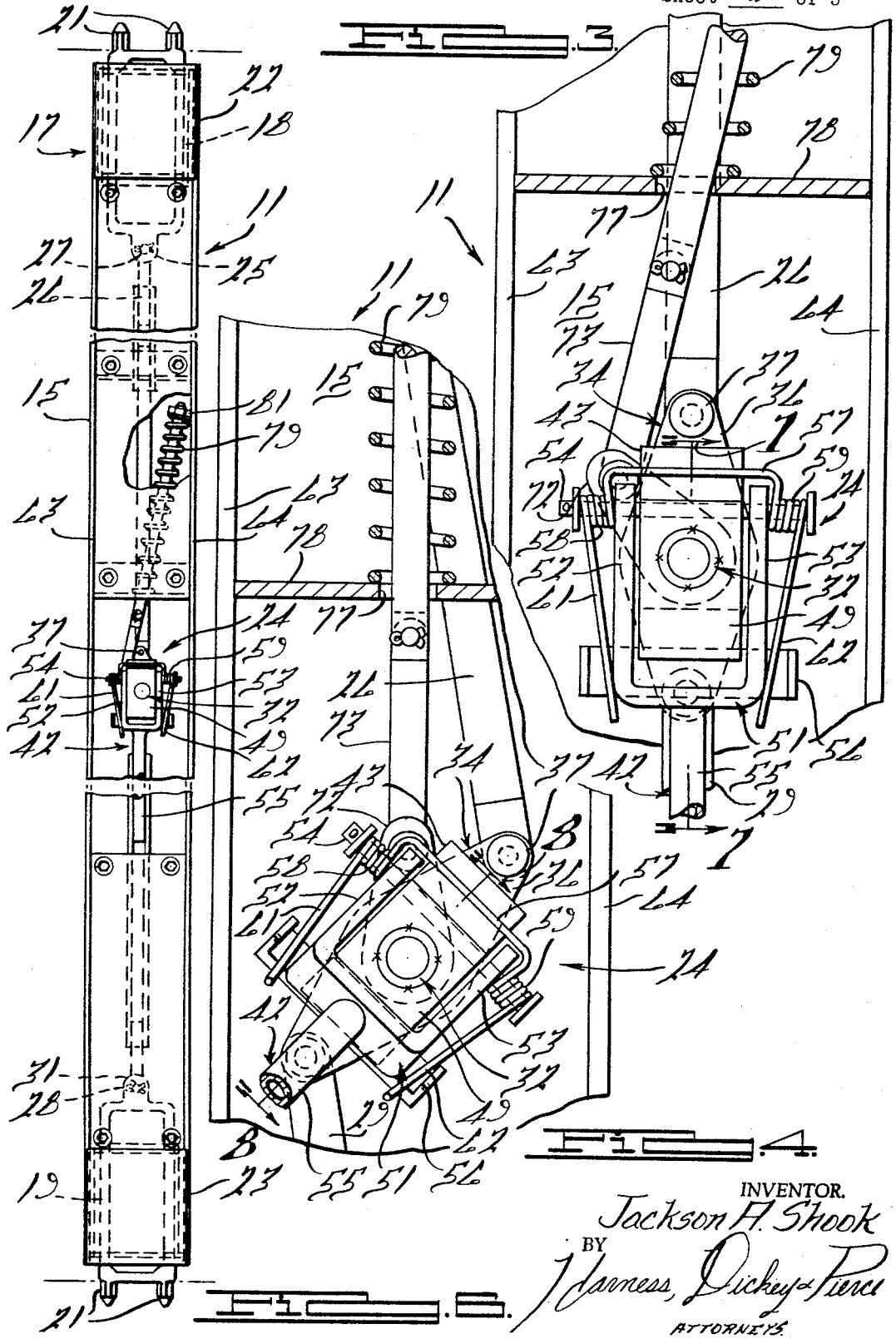

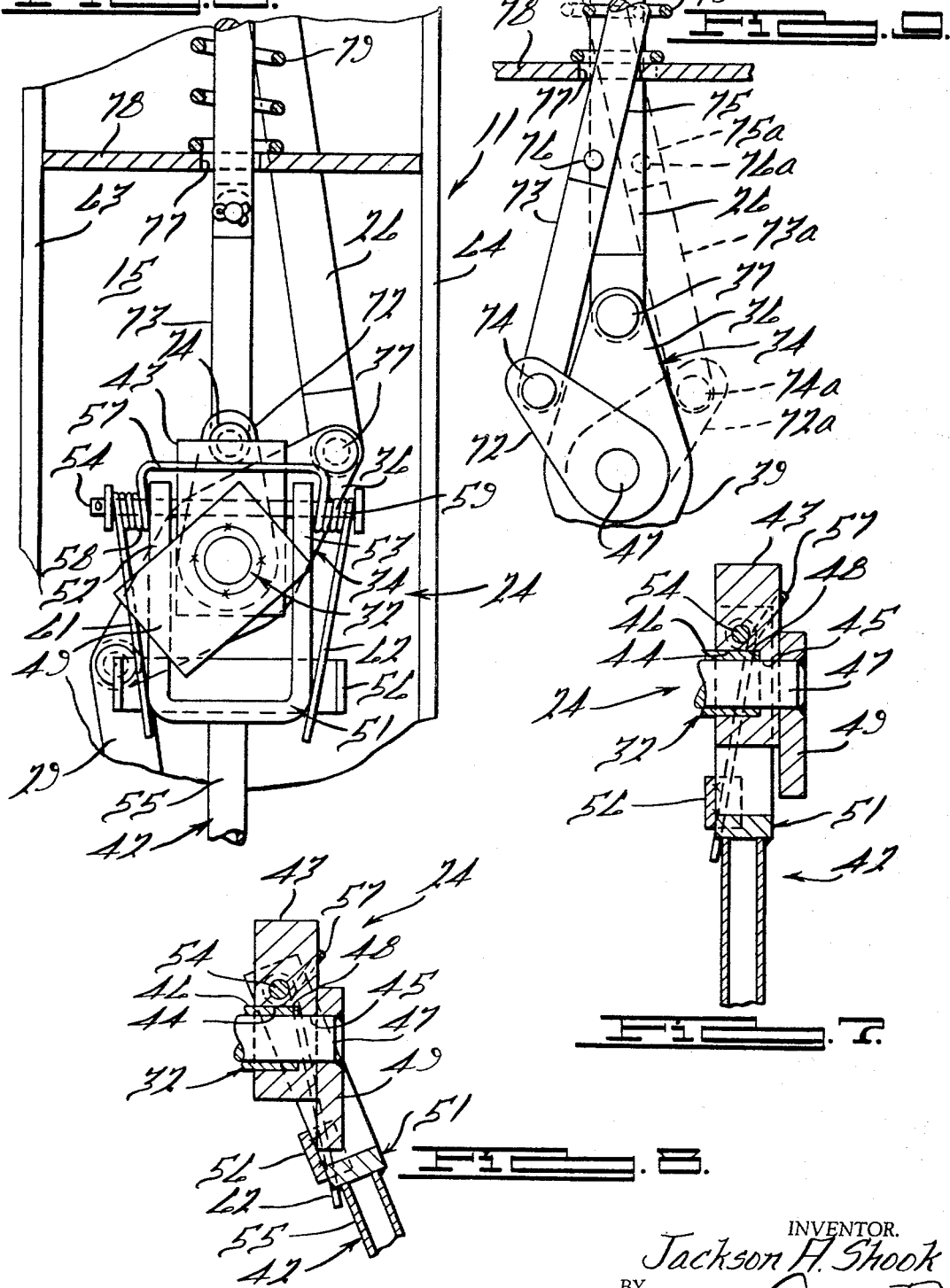

United States Patent Office 3,433,180
Patented Mar. 18, 1969

3,433,180
FREIGHT BRACING DEVICE
Jackson A. Shook, Northville, Mich., assignor to Evans Products Company, a corporation of Delaware
Filed July 6, 1966, Ser. No. 563,281
U.S. Cl. 105—376                                   18 Claims
Int. Cl. B61d *45/00;* E05c *9/16*

ABSTRACT OF THE DISCLOSURE

A bulkhead assembly for bracing freight in a cargo area embodying an improved operating mechanism for the bulkhead lock and an improved counterbalancing spring arrangement. The operating mechanism includes an operating handle that is pivotally supported with respect to the torsion shaft that operates the bulkhead lockpins about an axis that extends transversely to the axis of the torsion shaft. Pivotal movement of this operating handle about its respective pivot axis couples the handle to the torsion shaft whereby rotation of the handle about the axis of the torsion shaft will operate the torsion shaft. The spring mechanism includes a pair of oppositely disposed levers each of which is spring biased for moving the torsion shaft to its locked position.

---

This invention relates to a freight bracing device of the bulkhead type and more particularly to an improved operating structure and locking mechanism for restraining the freight bracing device in position.

As is well known, a freight bracing bulkhead is supported in some manner for movement along a cargo area to various cargo bracing positions. A locking mechanism, normally carried at opposite corners of the bulkhead, is provided for retaining the freight bracing bulkhead in these cargo bracing positions. To facilitate operation it is preferred in many instances to have all of the locking mechanisms operated by a common actuator. Frequently it is also desirable to provide a plurality of operating handles for operating the locking mechanism at any of several different locations with respect to the bulkhead. Preferably, some structure should be provided so that operation of the locking mechanism by means of one of the operating handles does not result in conjoint movement of the other operating handles.

It is, therefore, a principal object of this invention to provide a locking mechanism for a freight bracing bulkhead wherein the locking mechanism operator is independently movable of the operating handle.

It is a further object of this invention to provide a detachable connection between an operating member and an operating handle that is automatically engaged upon movement of the operating handle to an actuating position.

It is another object of the invention to provide an operating assembly comprised of an operating handle that is pivotally supported upon an operating member for movement between first and second positions and which is operatively coupled for rotation with the operating member in one of its pivotal positions.

An operating device embodying this invention is particularly adapted for actuating the locking mechanism of a freight bracing bulkhead or the like. The operating device comprises a first operating member operatively connected to the locking mechanism. Means support the first operating member for pivotal movement about a first axis for actuating the locking mechanism. A second operating member is supported for pivotal movement about a second axis relative to the first operating member between first and second operative positions. Means are provided for selectively coupling the operating members together upon pivotal movement of the second operating member about the second pivotal axis for joint pivotal movement of the operating members about the first axis. The selective coupling means comprises first and second means carried by the first and second operating members, respectively. These means are engageable upon pivotal movement of the second operating member about the second axis from its first to its second position. The means are out of engagement when the second operating means is in its first position for free relative pivotal movement of the operating members about the first axis.

Many forms of locking mechanisms embody a biasing structure for urging the locking member to one of its positions. It is a further object of this invention to provide an improved biasing means for a locking mechanism.

A biasing means embodying this invention is particularly adapted for use with the locking mechanism of a freight bracing bulkhead or the like. The biasing means acts upon an operating shaft that actuates the locking mechanism between its engaged and disengaged positions upon rotation of the operating shaft. The biasing means comprises a lever affixed to the shaft and a biasing member that is operative between a fixed abutment means and a movable abutment means having an operative pivotal connection to the lever. The distance between the abutment means is at a maximum when the shaft is in intermediate position between its first and second positions for minimum preload of the coil spring in the intermediate shaft position. The movable abutment means is adjustable relative to the lever for maintaining a predetermined preload upon the coil spring when the shaft is in its intermediate position.

As has been previously noted, it is desirable in many instances to provide a plurality of operating handles at spaced locations for operating a bulkhead locking arrangement. It is additionally desirable if the operating handles may be moved in either direction to operate the locking mechanism. This lends greater flexibility to the bulkhead assembly. It is difficult, however, to provide a simple biasing mechanism that resists movement of the common operating member and returns the common operating member to its engaged position.

It is, therefore, a further object of this invention to provide an improved biasing means for a bulkhead locking mechanism operating shaft that resists movement of the operating shaft in either direction.

A biasing mechanism embodying this feature of the invention also is particularly adapted for use in the locking mechanism of the freight bracing bulkhead. The operating mechanism includes a shaft that carries a first lever that is operatively connected to the bulkhead locking mechanism. The biasing mechanism comprises first and second biasing levers that are affixed to the operating shaft at the same angular displacement to the first lever but in opposite senses from it. Biasing spring means operate upon each of the biasing levers to preclude relative rotation of the shaft in either direction.

Other objects and advantages of this invention will become more apparent as this description proceeds, particularly when considered in conjunction with the accompanying drawings, wherein:

FIGURE 1 is a side elevational view, with portions broken away, of one side of the freight bracing bulkhead embodying this invention;

FIGURE 2 is an enlarged view of the encircled area of FIGURE 1;

FIGURE 3 is an end view taken in the direction of the arrow 3 in FIGURE 2;

FIGURE 4 is a view in part similar to FIGURE 3, showing the mechanism in another position;

FIGURE 5 is a view in part similar to FIGURES 3 and 4 showing the mechanism in still another position;

FIGURE 6 is an end view, with portions broken away, taken in the direction of the arrows 6—6 in FIGURE 1;

FIGURE 7 is a cross-sectional view taken along the line 7—7 of FIGURE 3;

FIGURE 8 is a cross-sectional view taken along the line 8—8 of FIGURE 4; and

FIGURE 9 is an elevational view showing the operative relationship of the biasing elements at opposite ends of the bulkhead assembly.

Referring now in detail to the drawings, a freight bracing bulkhead assembly embodying this invention is identified generally by the reference numeral 11. Only one side of the bulkhead assembly 11 is shown in the drawings inasmuch as both sides are substantially the same except as will be herein noted. The bulkhead assembly 11 is comprised of a frame having horizontally extending structural members 12, 13 and 14 that are connected together at each side by generally vertically extending side members 15, only one of which is shown. A bracket 16 is connected at each side of the bulkhead assembly 11 to the uppermost horizontal member 12 and to the upper end of the side member 15. A trolley beam assembly or the like (not shown) is carried at each side of the bulkhead assembly 11 by the brackets 16 for supporting the bulkhead assembly 11 for movement along a cargo area such as the interior of a railway freight car or the like in a known manner. A locking mechanism, indicated generally by the reference numeral 17 is provided at each side of the bulkhead assembly 11 for locking it in selected longitudinal positions of the cargo area, as will become more apparent as this description proceeds.

The locking mechanism 17 at each side of the bulkhead assembly 11 is substantially the same and is comprised of upper and lower locking pin forgings 18 and 19, respectively. Each of the locking pin forgings 18 and 19 has a pair of outwardly extending, integrally formed pins 21 that are adapted to be received in apertures formed in tracks (not shown) that extend along the length of the cargo area. Engagement of the pins 21 with the respective apertures serves to retain the bulkhead assembly 11 in any of a plurality of freight bracing positions. The upper locking pin forging 18 is reciprocable in a supporting member 22 that is affixed to the upper end of the bulkhead side member 15. In a like manner, the lower pin forging 19 is supported for reciprocation in a supporting member 23 that is fixed to the lower end of the side member 15. The pin forgings 18 and 19 slide in their respective supporting members 21 and 22 linearly from the engaged position shown to a disengaged position by means of an operating mechanism, indicated generally by the reference numeral 24.

The upper locking pin forging 18 is formed with an integral clevis 25 at its lower end that receives the upper end of an operating link 26. The operating link 26 is pivotally connected to the pin forging 18 at the clevis 25 by means of a pin 27. In a like manner, the lower pin forging 19 is formed with a clevis 28 that receives the lower end of a second operating rod 29 that is pivotally connected to the forging 19 by means of a pivot pin 31. A short operating shaft 32 is journaled upon the bulkhead side member 15 for rotation about a first axis, in any suitable manner. The operating shaft 32 has a pair of axially spaced bellcranks 33 and 34 affixed to it. The bellcranks 33 and 34 have upwardly extending lever arms 35 and 36, respectively, between which the lower end of the operating link 26 depends. The operating link 26 is pivotally connected to the lever arms 35 and 36 by means of a pivot pin 37. In a like manner, the upper end of the lower operating link 29 extends between depending lever portions 38 and 39 of the bellcranks 33 and 34 and is pivotally connected to them by means of a pivot pin 40.

Rotation of the operating shaft 32 will cause reciprocation of the locking pin forgings 18 and 19 at the respective side of the bulkhead assembly 11 through the action of the operating links 26 and 29. The operating mechanism for the locking pin forgings 18 and 19 at the side of the bulkhead is connected to a corresponding operating mechanism and locking pins at the opposite side of the bulkhead assembly by means of a torsion shaft 41 that spans the bulkhead assembly 11 and is affixed to a corresponding operating shaft at the opposite side.

An operating handle assembly 42 is supported at the outer side of the operating mechanism 24 so that an operator positioned adjacent the side of the bulkhead assembly 11 may operate the locking mechanism 17 at both sides of the bulkhead assembly 11. The operating handle assembly 42 comprises a supporting member 43 that has a stepped bore formed of coaxial sections 44 and 45 (FIGURES 7 and 8). The bore 44 receives an enlarged diameter portion 46 of the operating shaft 32 and the bore 45 receives a smaller diameter shaft portion 47 that is fixed to the portion 46. A shoulder 48 formed between the bores 44 and 45 limits the inward axial movement of the supporting member 43 relative to the operating shaft 32. An engaging member 49 is affixed, as by welding, to the outer end of the operating shaft 32 and has an inner surface that engages the outer face of the supporting member 43 so as to axially position the member 43 upon the operating shaft 32. The supporting member 43 is freely rotatable, however, upon the operating shaft 32.

A yoke 51 has a pair of upstanding arms 52 and 53 that straddle the supporting member 43 and are pivotally supported upon it by means of a pin 54. The pin 54 extends through a bore in the supporting member 43 positioned above the operating shaft 32 and transverse to it. A handle 55 is affixed to the yoke 51 between the arms 52 and 53. A generally U-shaped bracket 56 is fixed to the lower end of the yoke 51 below the lower edge of the supporting member 43 with its upper edge lying vertically above the lower end of the engaging member 49. The bracket 56 coacts with the engaging member 49 to limit the pivotal movement of the handle 55 about the axis defined by the pin 54, as will become more apparent as this description proceeds.

A spring assembly has a first generally straight portion 57 that extends across and engages the outer face of the supporting member 43. Adjacent the ends of the straight section 57 a pair of coiled ends 58 and 59 encircle the pin 54 and terminate in depending ends 61 and 62, respectively. The spring ends 61 and 62 bear against the outer face of the long legs of the U-shaped bracket 56 to bias the handle 42 about the pin 54 to a retracted position within the confines defined by a pair of outwardly extending legs 63 and 64 of the bulkhead side member 15.

The outer edges of the yoke legs 52 and 53 lie inwardly of the outer surface of the supporting member 43 and some distance behind the inner surface of the engaging member 49 (FIGURE 7). Thus, when the handle 42 is in its storage position, the operating shaft 32 and torsion shaft 41 may be rotated by means of the corresponding handle positioned at the opposite side of the bulkhead assembly 11 to operate the locking mechanism 17 without any movement of the operating handle assembly 42. In a like manner, other forms of operating handles may be positioned at any desired location with respect to the bulkhead assembly 11 for operating the locking mechanism 17 without concurrent motion of the operating handle assembly 42 described.

If it is desired to operate the locking mechanism 17 by the operating handle assembly 42, the handle 55 is grasped and rotated about the pivotal axis defined by the pin 54 outwardly of the side of the bulkhead free from the legs 63 and 64 of side member 15 (FIGURE 8 and dotted line view of FIGURE 2). This movement occurs until the front face of the long leg of the U-shaped bracket 56 contacts the lower edge of the engaging member 49. In this position the side surfaces of the legs 52 and 53 of the yoke 51 will be positioned to engage the sides of the engaging member 49. Rotation of the handle assembly 42 about the axis of the operating shaft 32 (FIGURE 4) in either the clockwise or counterclockwise direction will be transmitted to the engaging member 49 and hence to the shaft 32 so that the operating handle assembly 42 and shaft 32 rotate in unison. The locking mechanism 17 may thus be moved between its engaged and disengaged positions by means of the operating handle assembly 42. When the operating handle assembly 42 is biased to its storage position by the spring legs 61 and 62, the yoke legs 52 and 53 will not interfere with rotation of the torsion shaft 41, operating shaft 32 and engaging member 49 (FIGURE 5). Thus, the locking mechanism 17 at each side of the bulkhead assembly 11 can be operated by means of other handle assemblies (not shown), as has been noted.

The mechanism thus far described is identical at each side of the bulkhead assembly. That is, a locking mechanism 17, operating mechanism 24 and handle assembly 42, as described, are positioned at each side of the bulkhead assembly. Alternatively or additionally, an operating handle assembly of the type described may be positioned centrally of the bulkhead or at any other position therealong so long as it is provided with a form of detachable connection to the torsion shaft 41 that interconnects the locking mechanisms at the opposite side of the bulkhead.

A biasing spring arrangement is provided in each side of the bulkhead assembly 11 for maintaining the locking pin forgings 18 and 19 in their engaged position. Considering first the biasing means at the portion of the bulkhead assembly shown in FIGURE 1, a pair of aligned crank arms 71 and 72 are affixed to the operating shaft 32 at spaced axial locations from each other and at a fixed angular relationship to the bellcranks 33 and 34. At this side of the bulkhead assembly, the cranks 71 and 72 are offset in a counterclockwise direction from the bellcrank arms 35 and 36 as viewed in FIGURES 3 through 6 and FIGURE 9. The lower end of a link 73 extends into the gap between the crank arms 71 and 72 and is pivotally connected to them by means of a pivot pin 74. The upper end of the link 73 is pivotally connected to a bifurcated end of a biasing rod 75 by means of a pivot pin 76. The rod 75 extends through a generally circular aperture 77 formed in an abutment member 78 that is affixed to the bulkhead side member 15. The aperture 77 lies generally in the same vertical plane as the axis of the shaft 32 and of the pivot pin 37 that connects the bellcranks 33 and 34 to the operating rod 26 when the locking mechanism 17 is in its engaged position. A coil compression spring 79 encircles the biasing rod 75 and is in abutment at its lower end with the fixed abutment member 78. An internally threaded abutment member 81 is received upon a male threaded upper end of the biasing rod 75 and has a lower surface that engages the upper end of the coil spring 79.

When the locking mechanism 17 is in its fully engaged position, the crank arms 71 and 72 are in an over-center relationship and the coil spring 79 is held under compression between the abutment member 78 and the adjustable abutment member 81. Thus, the coil spring 79 exerts a force upon the operating shaft 32 that tends to rotate it in a clockwise direction, as viewed in FIGURES 3 through 6 and FIGURE 9. Thus, the spring 79 alone tends to move the locking pin forgings 18 and 19 to a disengaged position. A similar biasing arrangement is provided at the other side of the bulkhead (FIGURE 9) that exerts an opposite rotational effect upon the operating shaft 32 of equal magnitude so as to maintain the locking pin forgings 18 and 19 in their engaged position and resist any tendency for them to move to a disengaged position. The biasing mechanism at the opposite side of the bulkhead is exactly the same in construction as that previously described but is a mirror image of it. This biasing mechanism is identified by the same reference numerals bearing the suffix $a$ in FIGURE 9.

Referring to FIGURE 9, it will be noted that when the locking mechanism 17 is in its engaged position, the coil springs 79 and 79a exert substantially equal loads in opposite senses upon the operating shaft 32 and torsion shaft 42 so as to preclude its rotation. The manner for maintaining equal preloading upon the springs 79 and 79a will become more apparent as this description proceeds. If a force is exerted tending to rotate the operating shaft 32 in a clockwise direction, the crank arms 71 and 72 will cause the link 73 to be moved upwardly and to the right relieving the tension from the coil spring 79 and permitting it to urge the rod 75 upwardly. The lever 72a at the opposite side of the bulkhead, however, is rotated downwardly and to the right thus tensioning the coil spring 79a. This tensioning of the coil spring 79a resists relative rotation and tends to return the operating shaft 32 to its neutral position. Upon rotation of the operating shaft 32 in the opposite or counterclockwise sense, the springs exert opposite forces upon the operating shaft 32. After one of the links 72 or 72a reaches its vertical position, the respective coil spring will become unloaded. Further rotation of the operating shaft 32 will then load this coil spring as well as continuing to load the other spring and, thus, both springs will resist further movement of the operating shaft and tend to return it to the position in which the locking mechanism is engaged.

To adjust the preload upon the coil springs 79 and 79a, the operating shaft 32 is rotated in an appropriate direction so that the link 72 or 72a is positioned in a substantially vertical direction (FIGURE 5). The threaded abutment member 81 is then rotated until the coil spring 79 is engaged but is not precompressed. Simple thumb pressure will indicate when this point has been reached. Upon return of the operating shaft 32 to the position in which the locking mechanism 17 is engaged, a predetermined precompression will be placed upon the coil spring 79 which compression will be equal to the change in distance between the abutment member 77 and the adjustable abutment member 81 that occurs upon the pivotal movement of the lever 72.

While it will be apparent that the preferred embodiments of the invention disclosed are well calculated to fulfill the objects above stated, it will be appreciated that the invention is susceptible to modification, variation and change.

What is claimed is:

1. An operating device for the locking mechanism of a freight bracing bulkhead or the like comprising a shaft pivotally supported upon the bulkhead and operatively connected to the locking mechanism, said shaft being supported for pivotal movement about a first axis for actuating the locking mechanism, an operating handle supported for pivotal movement about a second pivot axis relative to said shaft, said handle being pivotal about said second axis between first and second positions, and means for selectively coupling said operating handle to said shaft upon pivotal movement of said operating handle about said second axis for joint pivotal movement of said operating handle and said shaft about said first axis, said selective coupling means comprising first engaging means having a projecting end affixed to one end of said shaft and second engaging means on said handle adapted to engage said projecting end of said first engaging means upon pivotal movement of said handle about said second axis from its first position to its second position, said engaging means being out of engagement when said handle is in its first position for free relative pivotal movement of said handle and said shaft about said first axis.

2. An operating device as set forth in claim 1 further including biasing means operative upon the shaft for maintaining the locking mechanism in one of its positions.

3. An operating device comprising a shaft supported for rotation about a first axis, a journal member rotatably supported upon said shaft, an engageable member affixed for rotation with said shaft, said engageable member having a surface facing said journal member for limiting the axial movement of said journal member along said shaft in one direction, an operating member, means pivotally supporting said operating member upon said journal member for pivotal movement about a second axis between first and second positions, said second axis being disposed traversely to said first axis, said operating member and said journal member being jointly rotatable about said first axis, and means on said operating member for engaging said engageable member upon pivotal movement of said operating member about said second axis for joint rotation of said operating member and said shaft, said last named means being out of engagement with said engageable member in a normal position of said operating member for free relative rotation of said shaft relative to said journal member and said operating member.

4. An operating device as set forth in claim 3 further including means for limiting the axial movement of the journal member upon the shaft in a direction opposite to the one direction.

5. An operating device comprising a shaft supported for rotation about a first axis, a journal member rotatably supported upon said shaft, an engageable member affixed for rotation with said shaft, said engageable member having a surface facing said journal member for limiting the axial movement of said journal member along said shaft in one direction, an operating member, means pivotally supporting said operating member upon said journal member for pivotal movement about a second axis between first and second positions, said operating member and said journal member being jointly rotatable about said first axis, and means on said operating member including facing surfaces defining an opening adapted to receive said engageable member upon pivotal movement of said operating member about said second axis, at least one of said facing surfaces being adapted to engage an adjacent surface of said engageable member when said operating member is in its second position for joint rotation of said operating member and said shaft about said first axis, said surfaces of said operating member and said engageable member being out of engagement when said operating member is in its first position for free relative rotation of said shaft relative to said journal member and said operating handle.

6. An operating device as set forth in claim 5 further including means for limiting pivotal movement of the operating member about the second axis into its second position.

7. An operating device as set forth in claim 6 wherein the means for limiting pivotal movement comprises means spanning the facing surfaces of said operating member and adapted to engage a surface of the engageable member.

8. An operating device as set forth in claim 7 further including biasing spring means having depending ends adapted to engage the means for limiting pivotal movement of the operating member for biasing said operating member into its first position.

9. An operating device comprising a shaft supported for rotation about a first axis, a journal member rotatably supported upon said shaft, an engageable member affixed for rotation with said shaft, said engageable member having a surface facing said journal member for limiting the axial movement of said journal member along said shaft in one direction, an operating member, means pivotally supporting said operating member upon said journal member for pivotal movement about a second axis between first and second positions, said journal member being formed with a stepped bore, said shaft defining a shoulder adjacent said stepped bore and adapted to engage said journal member at said stepped bore for limiting the axial movement of said journal member along said shaft in a direction opposite to said one direction, said operating member and said journal member being jointly rotatable about said first axis, and means on said operating member for engaging said engageable member upon pivotal movement of said operating member about said second axis for joint rotation of said operating member and said shaft, said last named means being out of engagement with said engageable member in a normal position of said operating member for free relative rotation of said shaft relative to said journal member and said operating member.

10. An operating device as set forth in claim 5 wherein the operating member is a bifurcated member having upstanding arms pivotally supported upon the journal member.

11. An operating device as set forth in claim 10 further including biasing spring means for urging the operating member to its first position.

12. An operating device as set forth in claim 11 in combination with a freight bracing bulkhead assembly including locking means supported by said bulkhead assembly for movement from an engaged to a disengaged position, and means for operatively connecting said shaft to said locking means for actuating said locking means upon rotation of said shaft about the first axis.

13. The combination as set forth in claim 12 further including a second operating device for rotating said shaft independent of the operating member.

14. The combination as set forth in claim 12 wherein the means for connecting the shaft to the locking mechanism includes an operating lever affixed to said shaft and further including a first biasing lever affixed to said shaft and displaced from said operating lever in a first sense, a second biasing lever affixed to said shaft and angularly displaced from said operating lever in an oposite sense to the displacement of said first biasing lever, the angular displacement of said biasing levers from said operating lever being of equal magnitude, first abutment means, first movable abutment means pivotally connected to said first biasing lever, second movable abutment means pivotally connected to said second biasing lever, first spring means in engagement with said fixed abutment means and said first movable abutment means for resisting rotary movement of said shaft in at least one direction, and second spring means in engagement with said fixed abutment means and said second movable abutment means for resisting rotary movement of said shaft in a direction opposite to said one direction.

15. A biasing arrangement for a rotatable operating member having an operating lever affixed thereto, said biasing arrangement comprising a first biasing lever affixed to the operating member and angularly displaced from the operating lever in a first sense, a second biasing lever affixed to the operating member and angularly displaced from the operating lever in an opposite sense to the displacement of said first biasing lever, the angular displacement of said biasing levers from the operating lever being of equal magnitude, fixed abutment means, first movable abutment means pivotally connected to said first biasing lever, second movable abutment means pivotally connected to said second biasing lever, first spring means in engagement with said fixed abutment means and said first movable abutment means for resisting rotary movement of the operating member in at least one direction, and second spring means in engagement with said fixed abutment means and said second movable abutment means for risisting rotary movement of the operating member in a direction opposite to said one direction.

16. A locking mechanism for retaining a freight bracing bulkhead or the like in position comprising an operating shaft, a locking mechanism, means operatively connecting said operating shaft to said locking mechanism for moving said locking mechanism between engaged and disengaged positions upon rotation of said operating shaft from a neutral position to displaced positions in either direction from said neutral position, first biasing means operatively connected to said shaft means for resisting rotation of said operating shaft in one direction from its neutral position, and second biasing means operatively connected to said operating shaft for resisting rotation of said operating shaft in its other direction from said neutral position, said first and second biasing means exerting substantially the same magnitude of biasing force upon said operating shaft in opposite senses when said operating shaft is in its neutral position.

17. A locking mechanism for retaining a freight bracing bulkhead or the like in position comprising an operating shaft, a locking mechanism, means operatively connecting said operating shaft to said locking mechanism for moving said locking mechanism between engaged and disengaged positions upon rotation of said operating shaft between first and second angular positions, a lever affixed to said shaft, fixed abutment means, movable abutment means having an operative pivotal connection to said lever, and biasing means operating between said abutment means and in engagement therewith, the distance between said abutment means being maximum when said shaft is in an intermediate position between the first and second position for minimum preload upon said biasing means in said intermediate shaft position, said movable abutment means being adjustable relative to said lever for maintaining a predetermined preload upon said biasing means when said shaft is in its intermediate position.

18. A locking mechanism as set forth in claim 17 wherein the biasing means comprises a coil spring and there is zero preload on said coil spring in the intermediate shaft position.

References Cited

UNITED STATES PATENTS 3,352,257  11/1967  Lehnert et al. _____ 105—376

DRAYTON E. HOFFMAN, *Primary Examiner.*

U.S. Cl. X.R.

292—35, 139

UNITED STATES PATENT OFFICE
CERTIFICATE OF CORRECTION

Patent No. 3,433,180                                                                March 18, 1969

Jackson A. Shook

It is certified that error appears in the above identified patent and that said Letters Patent are hereby corrected as shown below:

Column 7, line 6, "traversely" should read -- transversely --. Column 8, line 9, the claim reference numeral "5" should read -- 9 --.

Signed and sealed this 31st day of March 1970.

(SEAL)
Attest:

Edward M. Fletcher, Jr.                               WILLIAM E. SCHUYLER, JR.
Attesting Officer                                             Commissioner of Patents